United States Patent [19]
Pfeifer

[11] Patent Number: 4,838,687
[45] Date of Patent: Jun. 13, 1989

[54] METHOD FOR THE SIMULTANEOUS MEASUREMENT OF THREE VELOCITY COMPONENTS BY MEANS OF LASER DOPPLER ANEMOMETRY

[75] Inventor: Hans-Joachim Pfeifer, Rümmingen, Fed. Rep. of Germany

[73] Assignee: Institut Franco-Allemand De Recherches De Saint-Louis, Saint-Louis Cedex, France

[21] Appl. No.: 169,136

[22] Filed: Mar. 10, 1988

Related U.S. Application Data

[63] Continuation of Ser. No. 864,356, May 19, 1986, abandoned.

[30] Foreign Application Priority Data

May 24, 1985 [DE] Fed. Rep. of Germany ....... 3518800

[51] Int. Cl.$^4$ ........................ G01P 3/36; G01N 21/00; G01B 9/02
[52] U.S. Cl. .................................. 356/28.5; 356/343; 356/349
[58] Field of Search ................ 356/28, 28.5, 338, 343, 356/345, 349, 360; 332/7.51

[56] References Cited

U.S. PATENT DOCUMENTS

| | | | |
|---|---|---|---|
| 3,915,572 | 10/1975 | Orloff | 356/28.5 |
| 4,126,392 | 11/1978 | House | 356/28.5 |
| 4,470,696 | 9/1984 | Ballard | 356/28.5 |
| 4,506,979 | 3/1985 | Rogers | 356/28.5 |

OTHER PUBLICATIONS

T. Sato and O. Sasaki, "New 3-D Laser Doppler Velocimeter using Cross-Bispectral Analysis," *Applied Optics,* vol. 17, No. 24, Dec. 15, 1978, pp. 3890–3894.
*ICIASF* '85 Record, by H. J. Pfeifer, IEEE Publication, 1985, CH 2210-3/85/0000-0056.
*LDV System 9100-11 for Three Component Measurement,* paper published by TSI, Inc.
*Three Dimensional Laser Velocimetry: A Review,* by A. Boutier, Ch. D'Humeires and D. Soulevant, Proc. Second Intern Symposium on Applications of Laser Anemometry to Fluid Mechanics, paper No. 10.5, 1984.
*Technical Data,* Dantec, Inc., Skolvlande, Denmark, p. 45.

Primary Examiner—Stephen C. Buczinski
Assistant Examiner—Linda J. Wallace
Attorney, Agent, or Firm—Armstrong, Nikaido, Marmelstein, Kubovcik & Murray

[57] ABSTRACT

The subject matter of the invention is a technique which allows three components of the velocity of fluid flows to be measured simultaneously by means of methods based on the use of laser Doppler anemometry. In the present case an Argon-Ion laser serves as a light source for a conventional two-component system which produces with the blue line at 488 nm and with the green line at 515 nm two interference fringe patterns in the probe volume. The interference fringes are in this case oriented at a high angle to each other. The same Argon-Ion laser is used as a light source for pumping the dye laser which emits at a wavelength of approximately 600 nm. With this beam of light a third interference fringe system is generated which is also at a high angle with respect to the other two ones. The separation according to the three colors of the scattered light emanating from the probe volume is achieved by means of usual interference filters or colored filters.

11 Claims, 1 Drawing Sheet

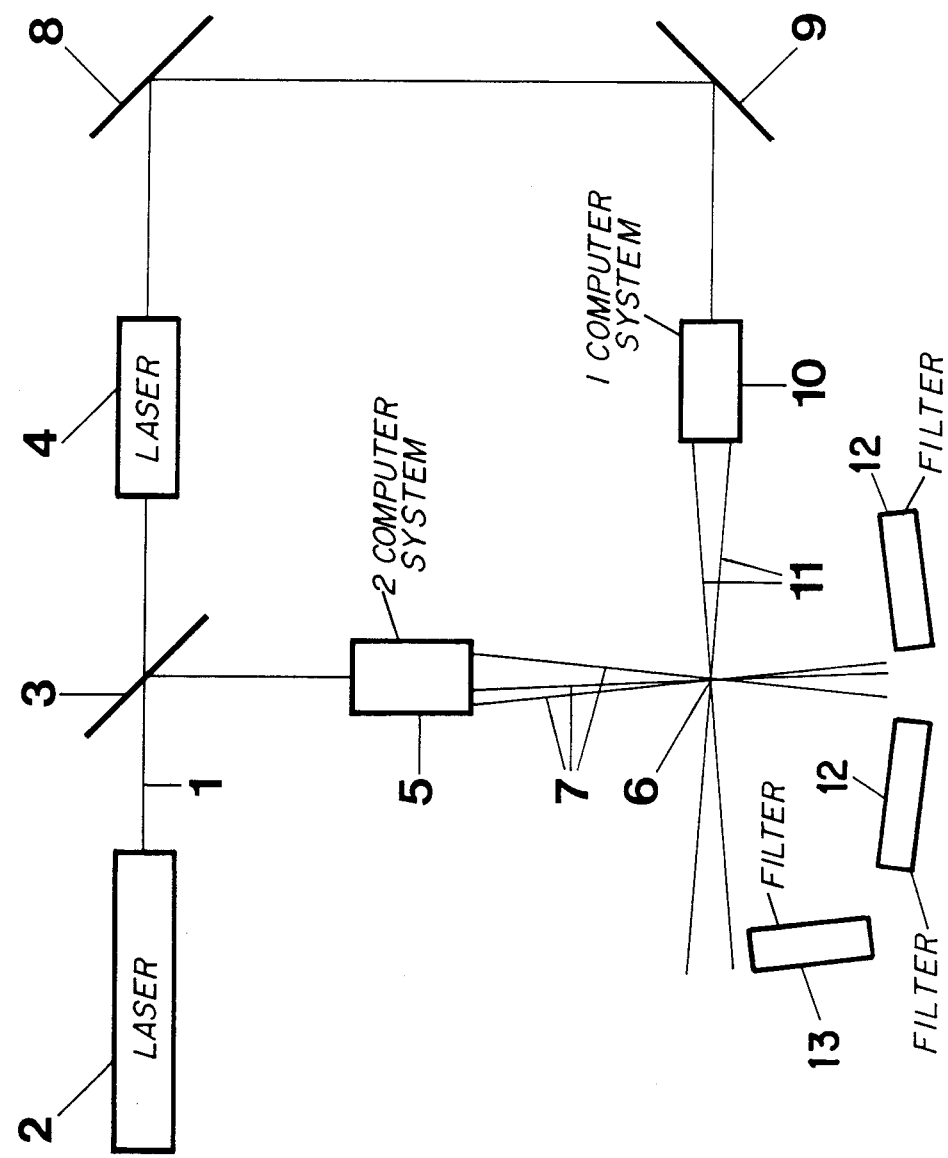

METHOD FOR THE SIMULTANEOUS MEASUREMENT OF THREE VELOCITY COMPONENTS BY MEANS OF LASER DOPPLER ANEMOMETRY

This application is a continuation of application Ser. No. 864,356 filed May 19, 1986, now abandoned.

BACKGROUND OF THE INVENTION

1. Field of the Invention

The invention relates to a method for the simultaneous measurement of three velocity components with the aid of laser Doppler anemometry using two continuous-wave lasers for the production of three interference fringe systems of different colours in a probe volume. This method is particularly used for measuring all three components of the velocity of a fluid flow.

2. Description of the Prior Art

In many flow studies the simultaneous measurement of all three components of the fluid flow velocity is of interest. For the majority of fluid flows, the shear stress is for instance one of the most important characteristics, which can only be determined by simultaneously measuring all three components of the velocity vector. In laser Doppler anemometry, in which small particles are used as flow velocity indicators, this means that either all velocity components of each individual particle have to be recorded or that three components of different particles which pass within a short time interval have to be acquired. The admissible duration of the time interval is in this case dependent on the time scale of the turbulence in the flow. For supersonic flows, for instance, the duration of this time interval must not exceed a few microseconds.

Laser Doppler anemometry, which is the basis of the invention described herein, is occasionally also termed "Doppler-difference method" or "fringe anemometry" (B. Lehmann, H. J. Pfeifer, H. D. vom Stein, DE-OS No. 16 73 403).

The reason for this is that two partial beams emanating from a laser are simultaneously directed onto the moving object the velocity of which has to be measured. Because of the difference in the angles, the two beams undergo slightly different Doppler shifts in the scattering process and this difference is used as a measure of the velocity. An equivalent explanation starts from the fact that the two partial beams generate an interference fringe pattern in the intersection volume and as an object passes through this fringe system, it appears alternately bright and dark and the modulation frequency of the light scattered in this way from the object is proportional to the velocity component in the plane perpendicular to the interference fringe system. In the simplest case such a fringe anemometer can therefore detect only a single velocity component.

In the past several optical arrangements have been desribed, which allow three velocity components to be determined simultaneously with the aid of laser Doppler anemometry. They are all extensions of two-component systems working with two colours of an Argon-Ion laser. With these two-component techniques the two strong lines emitted at the wavelengths 488 nm and 515 nm are filtered out and used to generate two interference fringe patterns in the probe volume, the fringes of different colours thereby being normal to each other at a large angle, in general 90 degrees. For both the production of the interference fringe system and the recording of the light scattered, the filtering process is either performed by dichroic reflectors or by interference filters and dispersion prisms.

Existing three-component systems may be divided into various categories. In the first one, simply only a third wavelength of the Argon-Ion laser is used to produce a third interference fringe system, the orientation of which is at a high angle with respect to the other two (W. J. YANTA, A Three Dimensional Laser Doppler Velocimeter for Use in Wind Tunnels, ICIASF"79 Record, IEEE Publication 79 CH 1500-8 AE, pp. 294–301, 1979). This method suffers from two drawbacks. On the one hand the output power of the third strongest line of the Argon laser is strongly below that of the two aforementioned lines. On the other hand this line at a wavelength of 477 nm is separated from the line at 488 nm by 11 nm only. Dichroic elements are no longer capable of separating the two lines. Interference filters are in the present case subject to strong losses and dispersion optics need long optical ways in the case of such a small line spacing, causing thereby instabilities in the whole arrangement. The same statements are true for the 497 nm line which is nearly as strong.

The second device for the simultaneous measurement of three components uses only the two strongest lines of the Argon-Ion lasr. In addition to the four beams of the two-component system a fifth laser beam either at 488 nm or at 515 nm is directed into the probe volume ("LDV System 9100-11 for Three Component Measurement", paper published by the TSI firm, Inc. 500 Cardington Road, St. Paul, Minn. 55164 USA). This partial beam produces a third fringe system along the propagation direction of the laser beams. The separation of the signals is in the present case provided by electronic means. A substantial disadvantage of this device is that for physical reasons in one interference fringe pattern the fringe spacing must be extremely small, i.e. of the order of 1 to 2 microns. Otherwise the fringe spacing becomes too large in the third system. Due to this small fringe spacing, this technique is only suited for very low velocities and it can never be used for velocities above 100 m/s.

Also in a third existing system for three-component measurements two colours of an Argon-Ion laser are used. With one of these colours, two orthogonal fringe systems are generated and separated by polarization. The third component is measured by a fringe system made of the second colour ("Laser Doppler Anemometry", pages 44 and 45, paper published by the DISA Elektronik A/S, Mileparken 22, 2740 Skovlunde, Denmark). The separation of two components by means of polarization, however, is only applicable if the particles do not change the polarization direction in the scattering process. However, this is very often the case so that the risk of an interaction between the two measurements cannot be excluded.

A similar set-up also uses one colour to determine two components. In this case two Bragg cells, operating at two different frequencies, provide at the same time the splitting of the beam into four partial beams and the different displacement speeds of the interference fringes generated in the probe volume and displayed nearly orthogonally to each other (F. L. Eltsley, F. L. Crosswy and D. Brayton, Transonic Wing/Store Flow Field Measurement Using a Laser Velocimeter, Technical Report AEDC-TR-80-54 1980, Arnold Engineering Development Center, Arnold Air Force Station, Tenn. 37389, USA). Separation of the two velocity components is carried out by electronic means again. The third component is recorded by the second colour again. In flows of high turbulence intensity, which are of major interest to the investigations conducted in fluid mechanics, separation of the two aforementioned signals is difficult and in many cases not possible.

Another technique should be mentioned here which allows the third component to be measured by the direct Doppler effect. The light scattered back from the particles is in part superposed to the initial beam of light emanating from the laser. This leads to a different in the frequencies, which allows the velocity component to be measured directly along the propagation direction of the laser beams. This method works only in the back scattering mode and is therefore limited to low velocities. With this method only large-size inert particles can be detected.

The German Pat. No. 31 06 025 (B. Lehmann) indicates that it is also possible to detect at the same time three velocity components with the aid of the direct Doppler technique according to Smeets. In this case essential characteristics of the fringe type anemometer are lost, for instance the possibility of observing single particles, working under the favorable conditions offered by the forward scattering mode, and using simple lasers presenting a short coherence length.

Finally a method should be mentioned in which two Argon-Ion lasers are used. In this case, one of the lasers produces the usual two-colour system at wavelengths of 488 nm and 515 nm. The second laser generates an interference fringe system at 477 nm (A. Boutier, "Three Dimensional Laser Velocimetry: A Review", Proc. Second Intern. Symposium on Applications of Laser Anemometry to Fluid Mechanics, paper No. 10.5, 1984, Instituto Superior Tecnico, Mech. Engn. Dept., 1096 Lisboa codex, Portugal). This technique differs from the aforementioned methods in that a relatively weak laser is used for the two-colour system whereas a strong laser is put into operation for the third colour. However, the aforementioned disadvantages inherent is this three-colour system, and pertaining to wavelengths which are too close together cannot be eliminated. In addition arrangements of this type including an Argon laser are obviously quite expensive. The only advantage over the first method mentioned above is that the amplitude of the scattered light is nearly same for all the three colours.

SUMMARY OF THE INVENTION

Therefore the invention has as its object to avoid the above-mentioned drawbacks of the prior art.

More particularly it is intended to improve the technique for the simultaneous measurement of three velocity components based on the use of laser Doppler anemometry as indicated above, in such a manner that the measuring accuracy can be strongly increased without much effort and that this measuring accuracy becomes to the largest possible extent independent of the magnitude of the velocity of the flow to be measured.

Starting from the aforementioned technique for the simultaneous measurement of three velocity components according to the invention the beam of light emanating from a laser is split into two partial beams one of which is used in a two-component system while the other is employed for pumping a second laser. In this manner three interference fringe systems of different colours are generated in a probe volume, which present a separation of the colours of more than 25 nm and which are oriented at a high angle with respect to one another.

According to the invention it is also possible to use two different continuous-wave lasers for the production of three interference fringe systems. To avoid the problems associated with Argon laser wavelengths which are too close together, a third colour is used according to the invention, which is the wavelength of another laser (dye laser). For instance this wavelength can be close to 600 nm. This additional laser is pumped with part of the Argon laser beam while the other part of the Argon laser beam serves to generate two interference fringe patterns of different colours in the probe volume.

According to the invention this technique allows the intensity of all the three interference fringe patterns in the probe volume to be set to very high levels on the one hand, but also to attain approximately identical levels such that for all the three components scattered light signals are generated which have all the same high quality. An interference between different signals is therefore completely excluded. In spite of the use of an additional laser the optical set-up is a relatively simple one. It is at least much simpler than that used in other well-known techniques. Finally the number of optical items to be used in the optical set-up can be strongly reduced.

Particularly advantageous configurations as well as improvements inherent in this invention are subject of the subclaims.

BRIEF DESCRIPTION OF THE DRAWING

In the following particulars of the invention described on the basis of an example of embodiment with reference to the drawing which shows the schematic diagram of the set-up designed and built according to the invention.

DESCRIPTION OF THE PREFERRED EMBODIMENT

As shown in the drawing, the beam of light 1 delivered by an Argon laser 2, with an output power above 5 W in all colours, is focused onto a beam splitter plate 3. The latter let pass 80% of the laser output power in the direction of the dye laser 4 and directs the remaining 20% toward the two-component system 5. The two-component system is a conventional one, i.e. it separates the lines with the wavelengths 488 nm and 515 nm by means of dichonic mirrors. Thus three beams 7 are directed into the probe volume 6. One beam has a wavelength of 488 nm, the other beam has a wavelength of 515 nm, and the third beam presents simultaneously the two wavelengths. Thus two interference fringe systems of different colours are generated in the probe volume 6, which are oriented at a high angle to each other.

The yellow output beam of the dye laser 4 with a wavelength of approximately 600 nm is directed via the mirrors 8 and 9 into a conventional one-component system 10 which produces two partial beams 11 of identical power. Thus a third interference fringe system is produced in the probe volume 6, which is also at a large angle with respect to the other two ones.

The dye laser has to fulfill one condition only, i.e. it must produce an output power. Other requirements such as frequency stability or power stability have not to be fulfilled so that the simplest model of a laser of this type can be used.

For the production of all three interference fringe systems Bragg cells are used such that it is possible to determine also the sign of the velocity vector for each of the three components.

Due to the large spacing separating the three colours used in the present case, the three velocity components can easily be separated in the recording of the scattered light signals. For the blue colour at 488 nm and for the gree colour at 515 nm, an unblocked interference 12 filter is used for each colour while a simple edge filter 13 will do for the yellow colour at 600 nm.

Since in the invention described here, all the three interference fringe patterns generated in the probe volume have a very high and nearly identical intensity, the scattered light signals generated for the three components all have the same high quality. Any interference between signals is therefore completely excluded. In spite of the use of an additional laser the optical set-up is much simpler than that used in all the techniques described so far. Also the number of optical items will be strongly reduced.

Consequently the invention is concerned with a technique which allows three components of a fluid flow velocity vector to be measured simultaneously by means of laser Doppler anemometry. It is based on the use of an Argon-Ion laser 2 which serves as the light source in a conventional two-component system 5 which produces with the blue line at 488 nm and with the green line at 515 nm two interference fringe patterns in the probe volume 6. The interference fringes are in this case oriented at a high angle to each other. The same Argon-Ion laser is used as a light source for pumping the dye laser 10 which emits at a wavelength of approximately 600 nm. With this beam of light a third interference fringe pattern is generated which is also at a high angle with respect to the other two ones. The separation according to the three colours of the scattered light emanating from the probe volume 6 is achieved by means of usual interference filters or colored filters.

I claim:

1. A method for the simultaneous measurement of three velocity components with the aid of a laser Doppler anemometry, said method comprising the steps of:
   using two continuous-wave lasers;
   producing three interference fringe systems having three different wavelengths in a probe volume in which the three velocity components are to be measured;
   aligning said three interference fringe systems at an angle up to 90° with respect to one another;
   optically separating said three different wavelengths by at least 25 nm; using optical filters; and
   measuring the modulation frequency of light scattered as an object passes through the probe volume to determine the three velocity components.

2. Method for the simultaneous measurement of three velocity components with the aid of laser Doppler anemometry according to claim 1 further comprising the steps of
   (a) splitting the beam of light emanating from the first laser into two partial beams,
   (b) using one of the partial beams to generate two interference fringe patterns of different wavelengths in the probe volume,
   (c) using the other of the partial beams for pumping the second laser, and
   (d) using the output beam of the second laser for the production of the third interference fringe pattern in the probe volume.

3. Method according to claim 2, further comprising the steps of using an Argon-Ion laser as the first laser and using a dye laser as the second laser.

4. Method according to claim 2, further comprising the step of having the two partial beams of light emanating from the first laser have different power preferably in the ratio of 80 to 20, the partial beam with the higher power level being used for pumping the second laser.

5. Method according to claim 2 further comprising the step of forming three beams from one of the partial beams, the first of these three beams having a wavelength of about 488, nm, the second having a wavelength of 515 nm, and the third beam having simultaneously the two wavelengths 488 nm and 515 nm.

6. Method according to claim 5, further comprising the step of directing the three beams into the probe volume along directions which form angles up to 90° to each other.

7. Method according to claim 2, further comprising the step of emanating the beam of light from the second laser at a wavelength of about 600 nm.

8. Method according to claim 7, further comprising the step of forming two partial beams of identical power from the beam of light of the second laser and directing said beams into the probe volume.

9. Method according to claim 2, further comprising the step of using Bragg cells for producing all the three interference fringe system.

10. Method according to claim 2, further comprising the step of setting the intensity of all three interference fringe systems in the probe volume to the same level.

11. Method according to claim 2, further comprising the step of using two unblocked interference filters and a simple edge filter for an analysis of scattered light signals coming from the probe volume.

* * * * *